United States Patent [19]

Iwasaki

[11] 4,324,137
[45] Apr. 13, 1982

[54] TEMPERATURE SENSOR

[75] Inventor: Shinichiro Iwasaki, Auburn Heights, Mich.

[73] Assignee: Aisin Seiki Company, Limited, Kariya, Japan

[21] Appl. No.: 182,812

[22] Filed: Aug. 29, 1980

[51] Int. Cl.³ .............................................. G01K 5/62
[52] U.S. Cl. ................................ 73/362 CP; 73/363.5
[58] Field of Search ............ 73/362 R, 362 CP, 363.5; 324/201, 208, 209; 323/362

[56] References Cited

U.S. PATENT DOCUMENTS 3,484,848  12/1969  Ohlsson ........................... 73/362 R
4,045,787  8/1977  Sidor et al. ....................... 73/362 R Primary Examiner—James J. Gill
Attorney, Agent, or Firm—Oblon, Fisher, Spivak, McClelland & Maier

[57] ABSTRACT

A temperature sensor including a casing and a core within the casing, where the core includes a bimetallic strip and a magnetically soft amorphous material secured to the strip. A change in temperature causes a deflection in the strip and hence a stress change in the magnetically soft amorphous material. An electrical coil is disposed about the core to convert the stress change in the magnetically soft amorphous member into an electrical signal.

7 Claims, 20 Drawing Figures

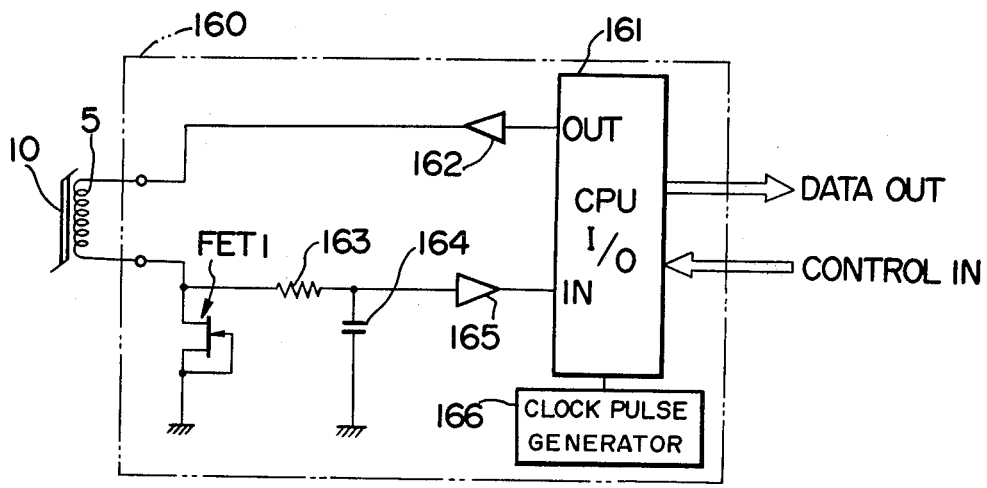
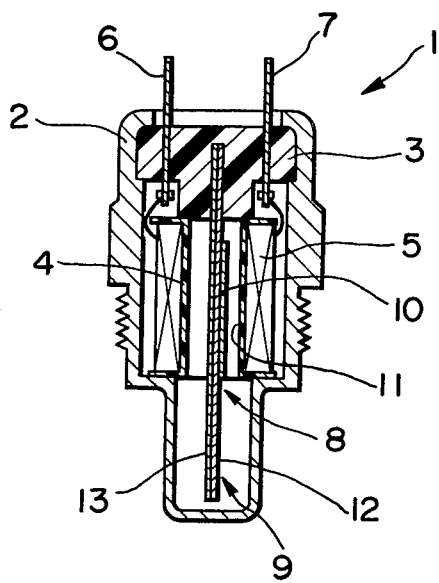

TEMPERATURE SENSOR

BACKGROUND OF THE INVENTION

1. Field of the Invention

The invention relates to a temperature sensor, and more particularly to a temperature sensor of the type which translates a stress change in a magnetically soft amorphous member, caused by a deflection of a bimetallic strip, into an electrical signal.

2. Description of the Prior Art

Conventional temperature sensors include thermistors which produce an electrical signal corresponding to a sensed temperature. However, thermistors have the disadvantage of having difficulty in obtaining linearity of the signal. Further, the sensor is subject to failure upon impact.

SUMMARY OF THE INVENTION

Accordingly, one object of this invention is to provide a novel temperature sensor having a high resistance to oscillation and shocks.

It is another object of this invention to provide a temperature sensor which requires a relatively simple processing of a temperature detection signal.

It is a further object of this invention to provide a temperature sensor capable of providing a deflection data read-out with a relatively simple read logic in the form of a large scale integrated circuit, such as a microcomputer.

In accordance with the invention, a bimetallic strip to which a magnetically soft amorphous member is attached is placed within a casing. An electrical coil is placed around the strip to generate an electrical signal indicative of the stress applied to the magnetically soft member due to the deflection of the bimetallic strip. The electrical coil has an increased number of turns so that the magnetically soft member can be magnetically saturated with a relatively low applied voltage or at a relatively low current level.

The time, T, required for the magnetically soft member to saturate from the instant of application of a voltage to a coil disposed about the member can be expressed approximately as follows:

$$T = (N/E) \cdot \phi \quad (1)$$

wherein E represents the voltage applied, N the number of turns in the coil, and $\phi$ a flux change from the remanent flux density to the flux density corresponding to the magnetic field of a predetermined electric current. $\phi$ varies in proportion to the permeability of the magnetically soft amorphous member. Therefore, when a stress such as tensile stress is produced in the magnetically soft amorphous member, the permeability thereof is increased in accordance with the tensile stress, thereby increasing $\phi$. When a compressive stress is produced therein, the permeability is decreased in accordance with the compressive stress, thereby decreasing $\phi$ accordingly. Therefore, the length of time, T, from the application of a voltage to the coil until the coil current reaches a given level is increased in accordance with the tensile stress in the magnetically soft amorphous member and decreased in accordance with the compressive stress therein. Accordingly, in the temperature sensor of the invention an electrical circuit or semiconductor electronic device is provided which determines the value of T and provides an electrical signal in the form of a voltage level or digital code indicative of such a value. Since the magnetically soft amorphous member must be manufactured by quenching from a liquid phase metal, it is formed as a thin sheet. It exhibits ferromagnetism and has a high level of magnetic saturation, high permeability ($\mu_{max} > 10^3$) and a low level of coercive force ($<1.0$Oe). Mechanically, it exhibits a very high break strength, an excellent resiliency and stability and is only slightly effected by temperature, as compared to a semiconductor device. Some magnetically soft materials are described in Hasegawa et al, "Soft Magnetic Properties of Metallic Glasses—Recent Developments," J. Appl. Phys. 50(3) March, 1979, pp. 1551-1556. Magnetically soft materials are sold under the trademark METGLAS (TM) by Allied Chemical Corp. These properties of an amorphous material are preferred for use in the temperature sensor of this invention. Its use advantageously facilitates signal processing and increases accuracy in the determination of the value of T. In addition, its manufacture is simplified while its resistance to oscillation or shocks is improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a graph showing the waveforms of input and output signals of the processing circuit shown in FIG. 2a;

FIG. 3b is a graph showing the waveform of input and output signals of the processing circuit shown in FIG. 3a;

FIG. 5 is a block diagram of an electronic processing unit connected to the temperature sesor shown in FIG. 1 for determining a time lag of the rising end of a current flow through an electrical coil of the temperature sensor in response to voltage pulses applied thereto from a single chip microcomputer;

FIG. 6e is a graph showing the voltage, Vx, with respect to the deflection Z when the coil of FIGS. 6a-6d is connected to the circuit of FIG. 2a;

FIG. 6f is a graph showing the time lag td with respect to the deflection Z when the coil of FIGS. 6a-6d is connected to the circuit of FIG. 3a;

FIG. 7 is a longitudinal cross-sectional view of a temperature sensor according to another embodiment of the invention;

FIG. 8b is a bottom view of the core of FIG. 8a;

FIG. 8e is a graph showing the voltage, Vx, with respect to the deflection Z when the coil of FIGS. 8a-8d is connected to the circuit of FIG. 2a; and FIG. 8f is a graph showing the time lag, td, with respect to the deflection Z when the coil on the core of FIGS. 8a-8d is connected to the circuit of FIG. 3a.

DESCRIPTION OF THE PREFERRED EMBODIMENTS

Figure 1:
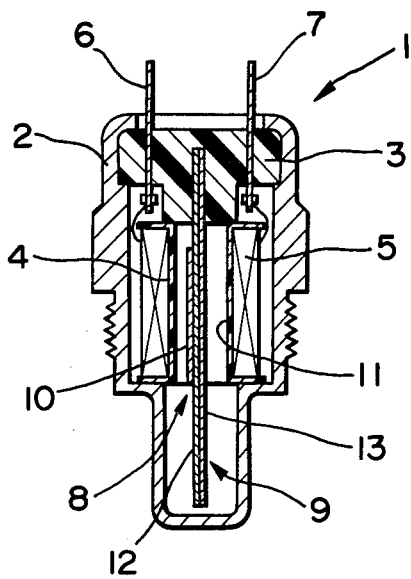
FIG. 1 is a longitudinal cross-sectional view of a temperature sensor according to one embodiment of the invention.

Referring now to the drawings, wherein like reference numerals designate identical or corresponding parts throughout the several views, and more particularly to FIG. 1 thereof, wherein a temperature sensor 1 includes a casing 2 with a plastic plug 3. An electrical coil 5 is wound around a bobbin 4, and is disposed in the casing 2. The ends of the electrical coil 5 are connected to terminals 6 and 7 respectively. A core 8 comprises a bimetallic strip 9 and a magnetically soft amorphous member 10 secured to the left side of the bimetal 9. The core passes through a guide hole 11 in the bobbin 4 and is held at the upper end thereof by the plug 3.

The bimetal 9 includes a high expansion metal 12 and a low expansion metal 13 which are deflected in response to the ambient temperature. For instance, an increase in the ambient temperature causes the bimetal 9 to be deflected to the right, thereby imparting a tensile stress in the magnetically soft amorphous member 10 secured to the high expansion metal 12.

Figure 2A:
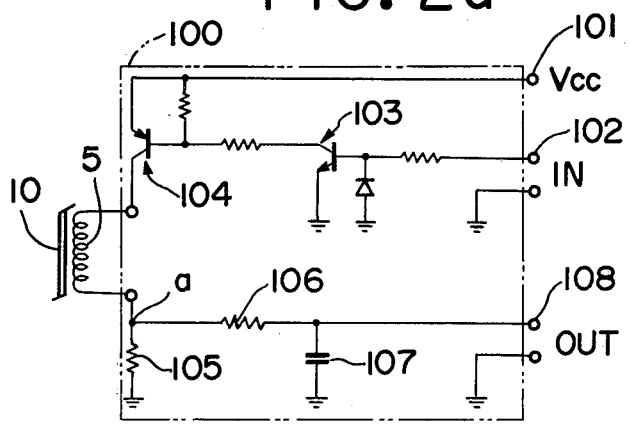
FIG. 2a is a circuit diagram of an electrical processing circuit connected to the temperature sensor shown in FIG. 1 for producing an analog voltage which corresponds to the temperature detected.

FIG. 2a shows one form of electrical processing circuit 100. The circuit 100 includes a terminal 101 adapted to be connected with a given d.c. voltage, on the order of +5 V, for example. The circuit also includes an input terminal 102, to which voltage pulses having a frequency on the order of 5-25 Khz, for example, are applied. An NPN transistor 103 which has its base connected to the terminal 102 is rendered conductive during the time the voltage pulses remain positive, and is rendered non-conductive when the voltage pulses assume a ground level. A PNP transistor 104 is turned on and off when the transistor 103 is turned on and off, respectively.

Figure 2B:
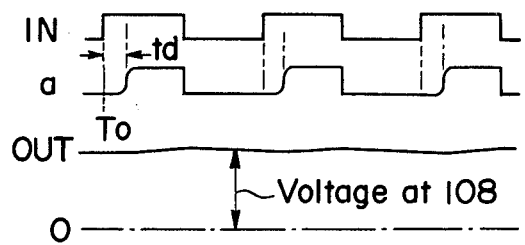

Hence, the supply voltage (Vcc) is applied to the electrical coil 5 during the time that the voltage pulses applied to the input terminal 102 remain positive, while no voltage is applied thereto during the time that the voltage pulses remain at the ground level. A voltage proportional to a current flow through the coil 5 is developed across a resistor 105, and is integrated by an integrator formed by a resistor 106 and a capacitor 107, with the integrated voltage appearing at an output terminal 108. FIG. 2b graphically shows the waveform of the input and the output voltages of the circuit shown in FIG. 2a. The time lag td between the rising end of the input voltage (IN) and the time that the voltage across the resistor 105 exceeds a given level, as well as the integrated voltage Vx, which represents an integral of the voltage across the resistor 105, depend on the stress on the magnetically soft amorphous member 10.

Figure 3A:
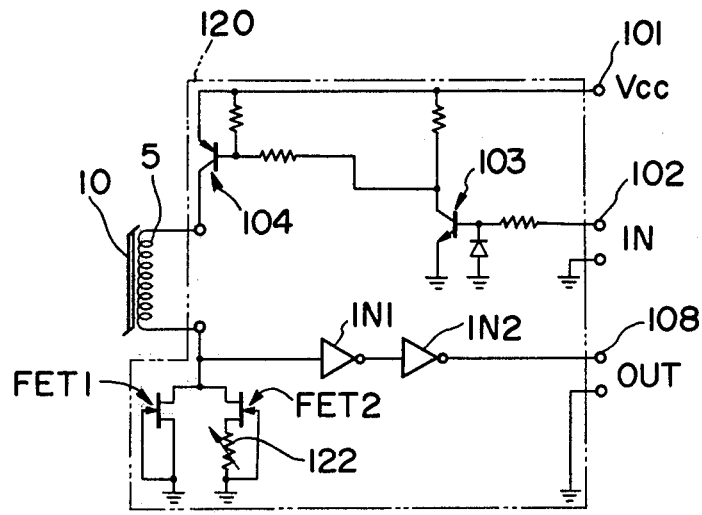
FIG. 3a is a circuit diagram of another electrical processing circuit connected to the temperature sensor shown in FIG. 1 for deriving a pulse indicative of a time lag corresponding to the temperature detected.

FIG. 3a illustrates another electrical processing circuit 120. In this instance, NPN transistor 103 and PNP transistor 104 are turned on during the time when the input voltage (IN) remains positive, thus enabling the application of a constant voltage to the coil 5. During the time the input voltage (IN) assumes the ground level, the NPN transistor 103 and PNP transistor 104 are turned off. A pair of junction N-channel field effect transistors FET 1 and FET 2 together form a constant current source which maintains a constant current flow through the coil. The current level through FET 2 can be adjusted by means of a variable resistor 122. The voltage developed at the terminal of the coil which is connected to FET 1 and FET 2 is fed to a pair of cascade connected inverting amplifiers IN 1 and IN 2, which amplify and shape it.

Figure 3B:

FIG. 3b graphically shows the waveform of input and output voltages of the circuit of FIG. 3a. The circuit 102 produces an output (OUT) in the form of voltage pulses delayed by a time lag, td, with respect to an input pulse (IN) with the magnitude of the time lag dependent on the stress on the magnetically soft amorphous member 10.

Figure 4:
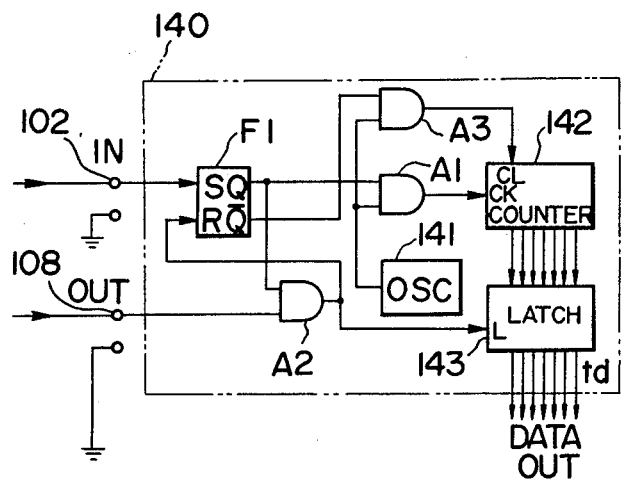
FIG. 4 is a block diagram of a counter circuit which converts a time lag between an input and an output pulse from the processing circuit of FIG. 3a into a digital code.

FIG. 4 shows a counter circuit 140 which converts the magnitude of td into a corresponding digital code. In the circuit of FIG. 4, the rising end of an input voltage (IN) sets a flipflop F1, whereby its Q output changes to a high level or "1", which enables an AND gate A1 to pass a pulse produced by a clock pulse oscillator 141 to a count pulse input CK of a counter 142. An output pulse (OUT) and the Q output of the flipflop F1 are applied to an AND gate A2, which produces a high level or "1" when the output pulse (OUT) rises to a high level. At this point in time, the flipflop F1 is reset, with its Q output reverting to a low level or "0". This disables the AND gate A1, and hence the supply of clock pulses to the counter 142 in interrupted. At the time when the AND gate A2 produces A "1" output, a code indicative of the count in the counter 142 is stored in a latch 143. After the flipflop F1 is reset and the latch 143 has been loaded with the count code, an AND gate A3 passes a clock pulse to clear the counter 142. An output code from the latch 143 indicates the number of clock pulses passed during the time interval, td, and hence represents the magnitude of td.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse generator 166. The combination of the resistor 163 and the capacitor 164 forms a filter which removes voltage oscillations of higher frequencies than the frequency of the input and the output pulses. The microcomputer 161 forms pulses of a given frequency in a range from 5 to 30 KHz in response to the clock pulses, and feeds them to the amplifier 162. At the same time the microcomputer 161 monitors the voltage developed at the junction between the N-channel FET 1 and one end of the coil, through the output voltage of the amplifier 165. Further, it counts the clock pulses which are developed during the time starting with the rising end of the pulse outputted by itself and ending when the output voltage of the amplifier 165 rises to a given level. Such a time interval corresponds to td, and the microcomputer forms an output code indicative of the value of td (DATA OUT).

The temperature sensor 1 of FIG. 1 will generate an electrical signal in accordance with the deflection of the strip by means of the circuit 100, 120 or 140 or the processing unit 160 as follows: When the ambient temperature is increased to deflect the bimetal strip 9 to the right, the magnetically soft amorphous member 10 secured to the high expansion metal 12 is subjected to tensile stress. In a test of the device the left end of the core 8 was fixed to a vise 14, the core 8 carrying two sets of magnetically soft amorphous members 10, each comprised of two sheets and being adhered to the top side of an epoxy resin substrate 30 as shown in FIGS. 6a–6d. The dial guage, not shown, is set at the distance of 5 mm from the right end of core 8 to measure the deflection Z of the core 8 in the X direction. The specific values of various parameters, the material of the magnetically soft member as well as the data obtained, are indicated in Table 1 below as Cases No. 1 and 2. It should be noted that the same result may be obtained although the test was carried out by measuring the deflection of the epoxy resin material 30 instead of using the bimetal 9 in the embodiment shown in FIG. 1.

TABLE 1

| Case No. | Magnetically Soft Amorphous Member 10 | | | | | | | |
|---|---|---|---|---|---|---|---|---|
| | Material, Atomic weight percent | | | | Tickness mm | a mm | b mm | number of sheets |
| | Fe | Ni | P | B | | | | |
| 1 | 40 | 40 | 14 | 6 | 0.058 | 80 | 1.8 | 4 |
| 2 | 40 | 40 | 14 | 6 | " | " | " | " |
| 3 | 40 | 40 | 14 | 6 | " | " | " | " |
| 4 | 40 | 40 | 14 | 6 | " | " | " | " |

Figure 6A:
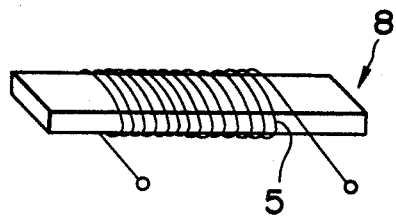
FIG. 6a is perspective view of a core in a test apparatus for determining the voltage, Vx, and the pulse time lag, td, in correspondence to the deflection of one end of the core.
Figure 6B:
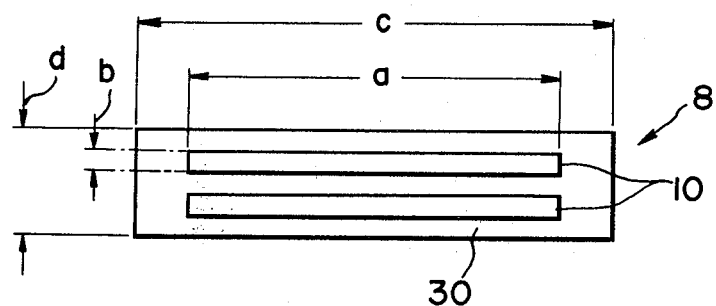
FIG. 6b is a plan view of the core of FIG. 6a with the electric coil being omitted.
Figure 6C:
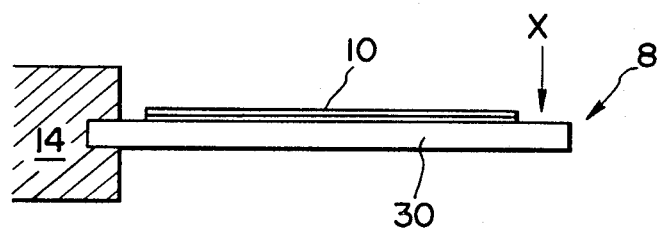
FIG. 6c is a front view of the test apparatus for applying a deflection to the magnetically soft amorphous member and core of FIGS. 6a and 6b.
Figure 6D:
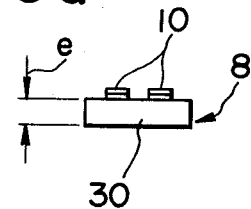
FIG. 6d is a right side view of FIG. 6c.
Figure 6E:
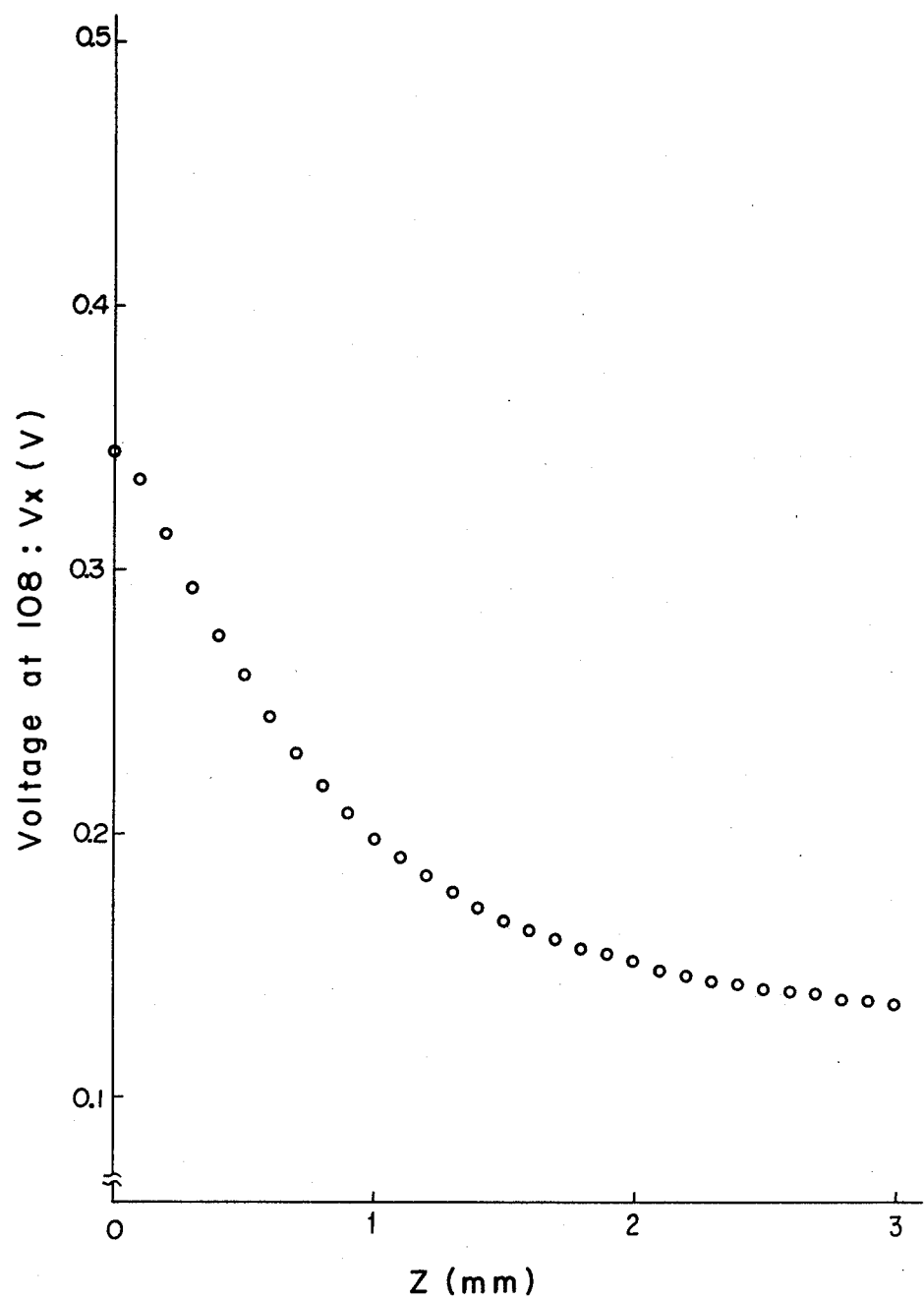
Figure 6F:
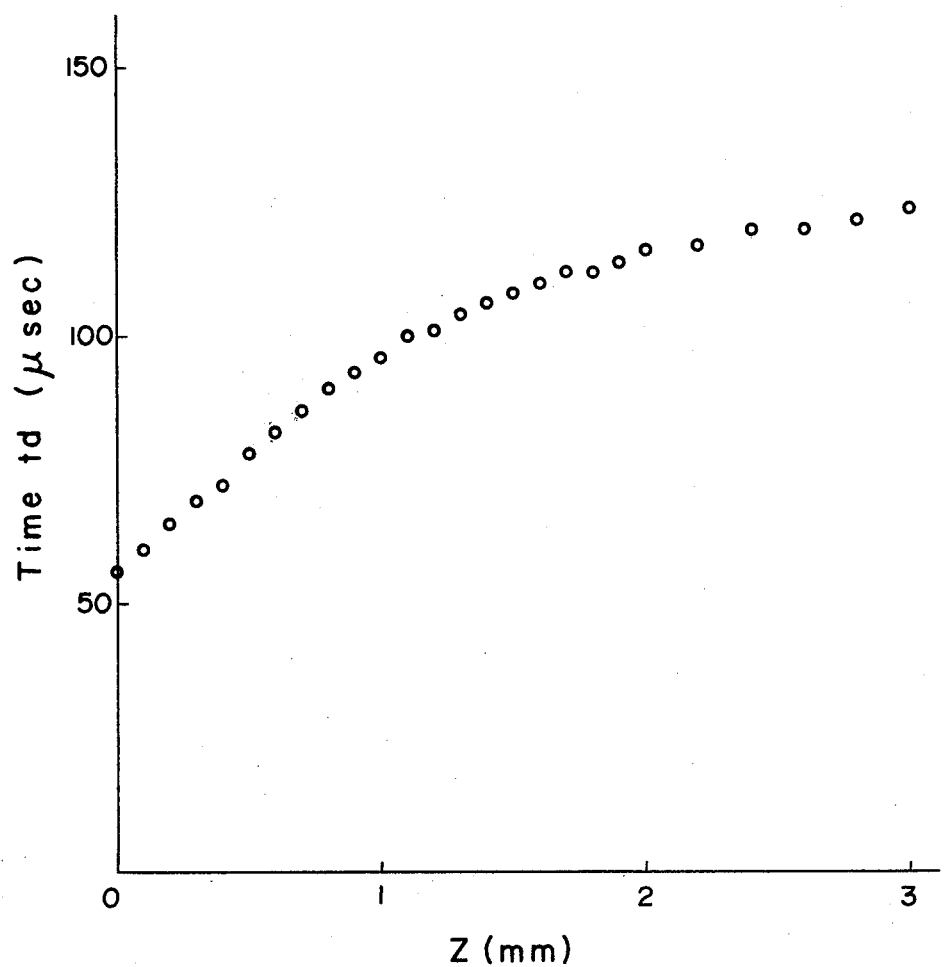
Figure 8A:
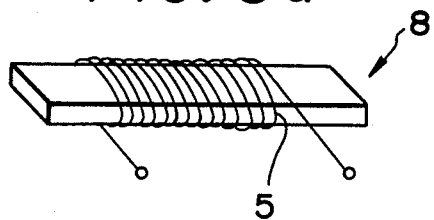
FIG. 8a is a perspective view of a core in a test apparatus determining the voltage, Vx, and the pulse time lag, td, in correspondence to the deflection of one end of the core.
Figure 8B:
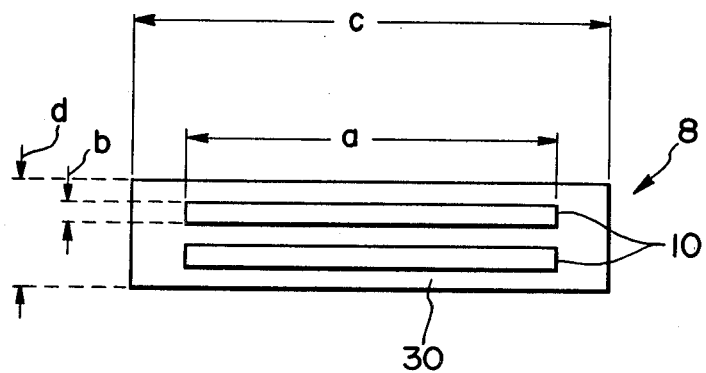
Figure 8C:
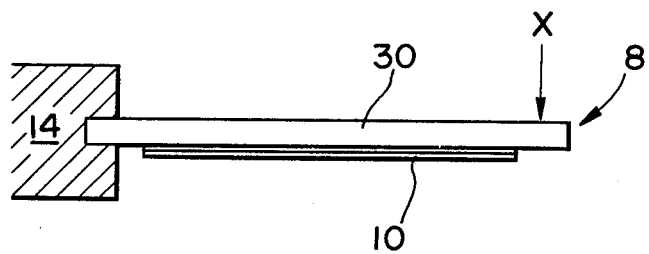
FIG. 8c is a front view of the test apparatus for applying a deflection to the magnetically soft amorphous member and core of FIGS. 8a and 8b.
Figure 8D:
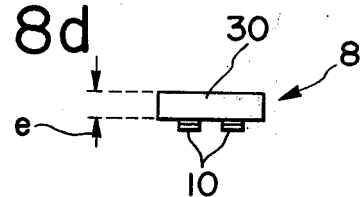
FIG. 8d is a right side view of FIG. 8c.
Figure 8E:
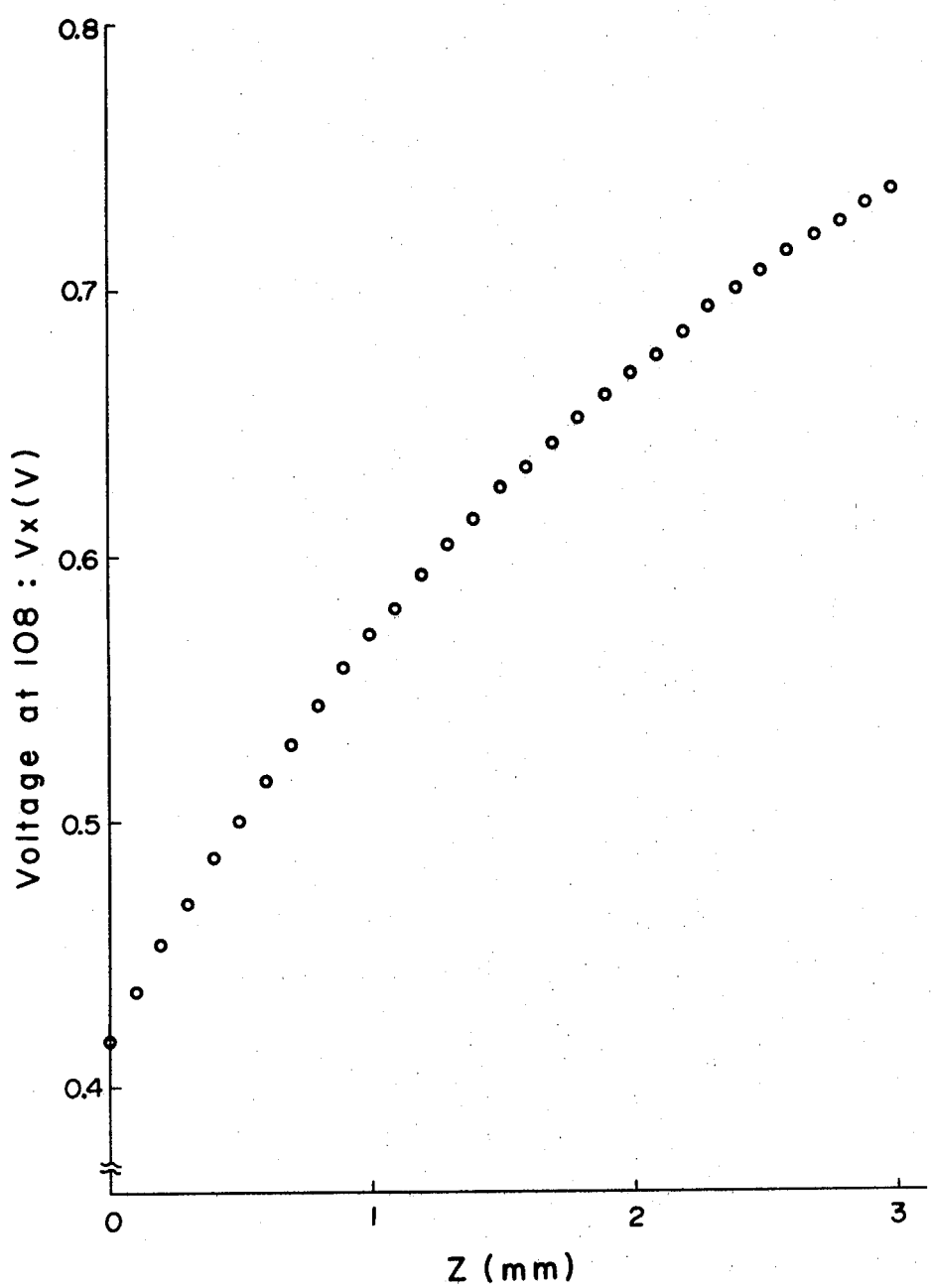
Figure 8F:
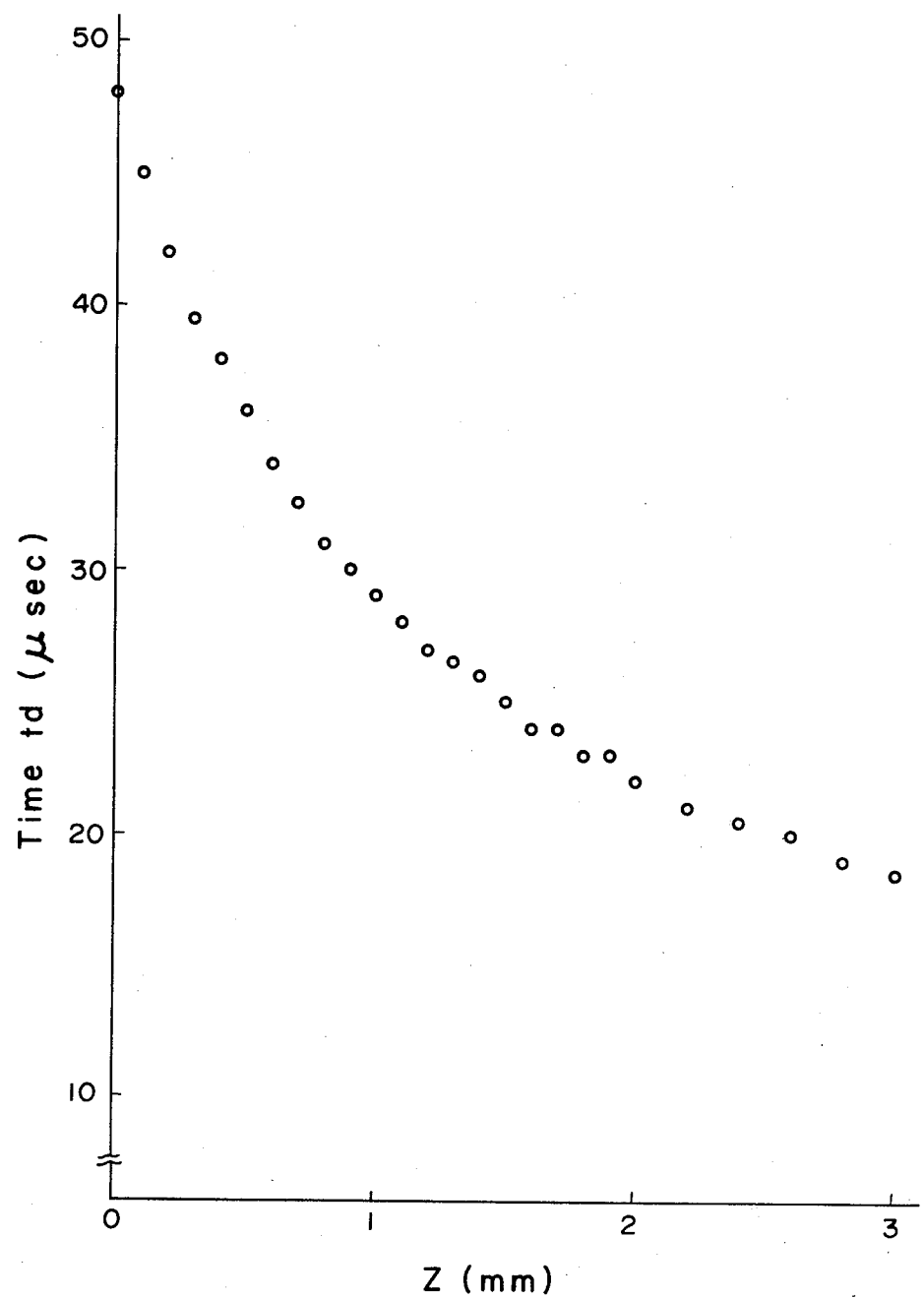

| Case No. | Epoxy resin substrate 30 | | | Coil 5 Number of turns | Measuring means and frequency of input pulse | Data |
|---|---|---|---|---|---|---|
| | c mm | d mm | e mm | | | |
| 1 | 95 | 6 | 0.6 | 2000 | Circuit 100 5 KHZ | FIG. 6e |
| 2 | " | " | " | " | Circuit 120 & Syncroscope 100 HZ | FIG. 6f |
| 3 | " | " | " | " | Circuit 100 5 KHZ | FIG. 8e |
| 4 | " | " | " | " | Circuit 120 & Syncroscope 100 HZ | FIG. 8f |

In Case No. 1, it is seen from the graph shown in FIG. 6e that the voltage Vx changes rapidly enough to be accurately measured in the range of 0–1.8 mm of deflection.

In Case No. 2, it is seen from the graph shown in FIG. 6f that a time lag td of high linearity and rapid change can be obtained in either of the ranges of 0–0.9 mm and 1.0–1.8 mm of deflection Z.

With reference, then, to FIGS. 7 to 8f, a second embodiment of the invention is shown. In FIG. 7, a temperature sensor 1 includes a casing 2 with a plastic plug 3. An electrical coil 5 wound around a bobbin 4 is disposed in the casing 2, with the ends of coil 5 being connected to terminals 6 and 7 respectively. A core 8 comprises a bimetallic strip 9 and a magnetically soft amorphous member 10 secured to the right surface of the bimetallic strip 9. The core 8 passes through a hole 11 in the bobbin 4 and the top end of the bimetallic strip 9 is rigidly fitted in the plug 3. The bimetal 9 includes a low expansion metal 12 and a high expansion metal 13 to cause a deflection in response to a change in ambient temperature. For instance, an increase in the ambient temperature causes a deflection of bimetal 9 to the right to generate a compressive stress in the magnetically soft amorphous member 10 secured to the low expansion metal 12.

The temperature sensor 1 of FIG. 7 will produce an electrical signal in accordance with the deflection by means of the circuit 100, 120 or 140 or the processing unit 160 as follows: When the ambient temperature is increased to deflect the bimetal 9 to the right, the magnetically soft amorphous member 10 secured to the low expansion metal 12 is subjected to compressive stress. In a test of the device the left end of the core 8 was fixed to a vise 14, the core 8 carrying two sets of magnetically soft amorphous members, 10 each comprised of two sheets and being adhered to the bottom side of an epoxy resin substrate 30 as shown in FIGS. 8a–8d. The dial guage, not shown, is set at the distance of 5 mm from the right end of core 8 to measure the deflection Z of the core 8 in the X direction. The specific values of various parameters, the material of the magnetically soft member as well as the data obtained are indicated in Table 1 above as Cases No. 3 and 4. It should be noted that the same result may be obtained, although the test result was carried out by measuring the deflection of the epoxy resin material 30 instead of using the bimetal 9 in the embodiment shown in FIG. 7.

In Case No. 3, it is seen from the graph shown in FIG. 8e that the voltage Vx changes rapidly enough to be accurately measured in the range of 0–3 mm deflection.

In Case No. 4, it is seen from the graph shown in FIG. 8f that a time lag td of a high linearity and rapid change can be obtained in either of the ranges of 0–0.8 mm or 0.9–2 mm of deflection.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature sensor comprising
   a casing;
   a core, including a bimetallic element and a magnetically soft amorphous member secured to the bimetallic element, disposed in said casing;
   an electrical coil disposed about said core;
   wherein a change in temperature causes a deflection of said bimetallic element and a change in the permeability of the magnetically soft member which is sensed by said electrical coil.

2. A temperature sensor according to claim 1, further comprising:
   a bobbin fixed in said casing.

3. A temperature sensor according to claim 1, wherein:
   said magnetically soft amorphous member is secured to at least one side of said bimetallic element.

4. A temperature sensor according to claim 1, wherein:

said bimetallic element comprises a high expansion metal and a low expansion metal adhered to each other.

5. A temperature sensor according to claim 4, wherein:
said magnetically soft amorphous member is secured to said high expansion metal of said bimetallic element.

6. A temperature sensor according to claim 4, wherein:
said magnetically soft amorphous member is secured to said low expansion metal of said bimetallic element.

7. A temperature sensor according to claim 1, wherein:
said magnetically soft amorphous member is comprised of a plurality of sheets arranged parallel to said bimetallic element.

* * * * *